(12) United States Patent
Huang

(10) Patent No.: US 7,281,701 B1
(45) Date of Patent: Oct. 16, 2007

(54) FASTENER FOR STRAPS

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 0 days.

(21) Appl. No.: 11/615,214

(22) Filed: Dec. 22, 2006

(51) Int. Cl.
*B21F 9/00* (2006.01)

(52) U.S. Cl. .................. 254/218; 254/238; 24/70 ST; 24/69 CT

(58) Field of Classification Search ............. 254/217, 254/218, 237, 238; 24/68 R, 70 ST, 69 ST, 24/69 CT
See application file for complete search history.

(56) References Cited

U.S. PATENT DOCUMENTS 4,227,286 A * 10/1980 Holmberg ............. 24/68 CD
5,943,742 A * 8/1999 Huang ................. 24/68 CD
6,609,275 B1 * 8/2003 Lin ..................... 24/68 CD
6,682,053 B1 * 1/2004 Chou ................... 254/218

OTHER PUBLICATIONS

Taiwanese Patent Publication No. 225765, Feb. 2006, 6 pages.

* cited by examiner

*Primary Examiner*—Emmanuel M Marcelo
(74) *Attorney, Agent, or Firm*—Alan Kamrath; Kamrath & Associates P.A.

(57) ABSTRACT

A fastener includes a frame, a handle and a reel inserted through the frame and handle so that a strap can be reeled when the reel is rotated. Two protective units are formed on the frame or the handle for protecting the reel from the handle or the frame. Two ratchet wheels are connected to the reel. A first detent is movable on the frame for engagement with the ratchet wheels. A second detent is movable on the handle for engagement with the ratchet wheels.

14 Claims, 17 Drawing Sheets

US 7,281,701 B1

FASTENER FOR STRAPS

BACKGROUND OF INVENTION

1. Field of Invention

The present invention relates to a fastener for straps.

2. Related Prior Art

Taiwanese Patent Publication No. 225765 discloses a conventional fastener. The fastener includes a reel 4, a first handle 1 connected to the reel 4, a second handle 2 connected to the reel 4, two ratchet wheels 6 connected to the reel 4, a first spring-loaded detent 3 located on the first handle 1 and a second spring-loaded detent 5 located on the second handle 2. A first strap B is connected to the first handle 1 while a second strap B is connected to the reel 4. The first handle 1 includes two walls each including a first arched edge, a second arched edge and a shoulder 12 between the first and second arched edges. The second handle includes two cams. To fasten the straps B, the second handle 2 is pivoted from the first handle 1. The pivoting is limited by the second spring-loaded detent 5 pressing against the shoulders 12 of the first handle 1. To loosen the straps B, the second spring-loaded detent 5 is moved onto the second arched edges of the first handle 1 and, therefore, kept from the ratchet wheels 6 while the first spring-loaded detent 3 is disengaged from the ratchet wheels 6 by the cams of the second handle 2. However, it is difficult to reel in the second strap B. Referring to FIG. 17 of the drawings of the present application, the second arched edges of the first handle 1 are pushed by the second spring-loaded detent 5 while the cams of the second handle 2 are pushed by the first spring-loaded detent 3 so that the reel 4 is "handcuffed" by the handles 1 and 2.

The present invention is therefore intended to obviate or at least alleviate the problems encountered in the prior art.

SUMMARY OF INVENTION

According to the present invention, a fastener includes a frame, a handle and a reel inserted through the frame and the handle so that a strap can be reeled when the reel is rotated. Two protective units are formed on the frame or the handle for protecting the reel from the handle or the frame. Two ratchet wheels are connected to the reel. A first detent is movable on the frame for engagement with the ratchet wheels. A second detent is movable on the handle for engagement with the ratchet wheels.

The primary advantage of the fastener according to the present invention is free reeling of the strap since the protective units keep the reel from the handle or the frame.

Other advantages and features of the present invention will be apparent from the following description referring to the drawings.

BRIEF DESCRIPTION OF DRAWINGS

The present invention will be described via detailed illustration of five embodiments referring to the drawings.

DETAILED DESCRIPTION OF EMBODIMENTS

Figure 1:
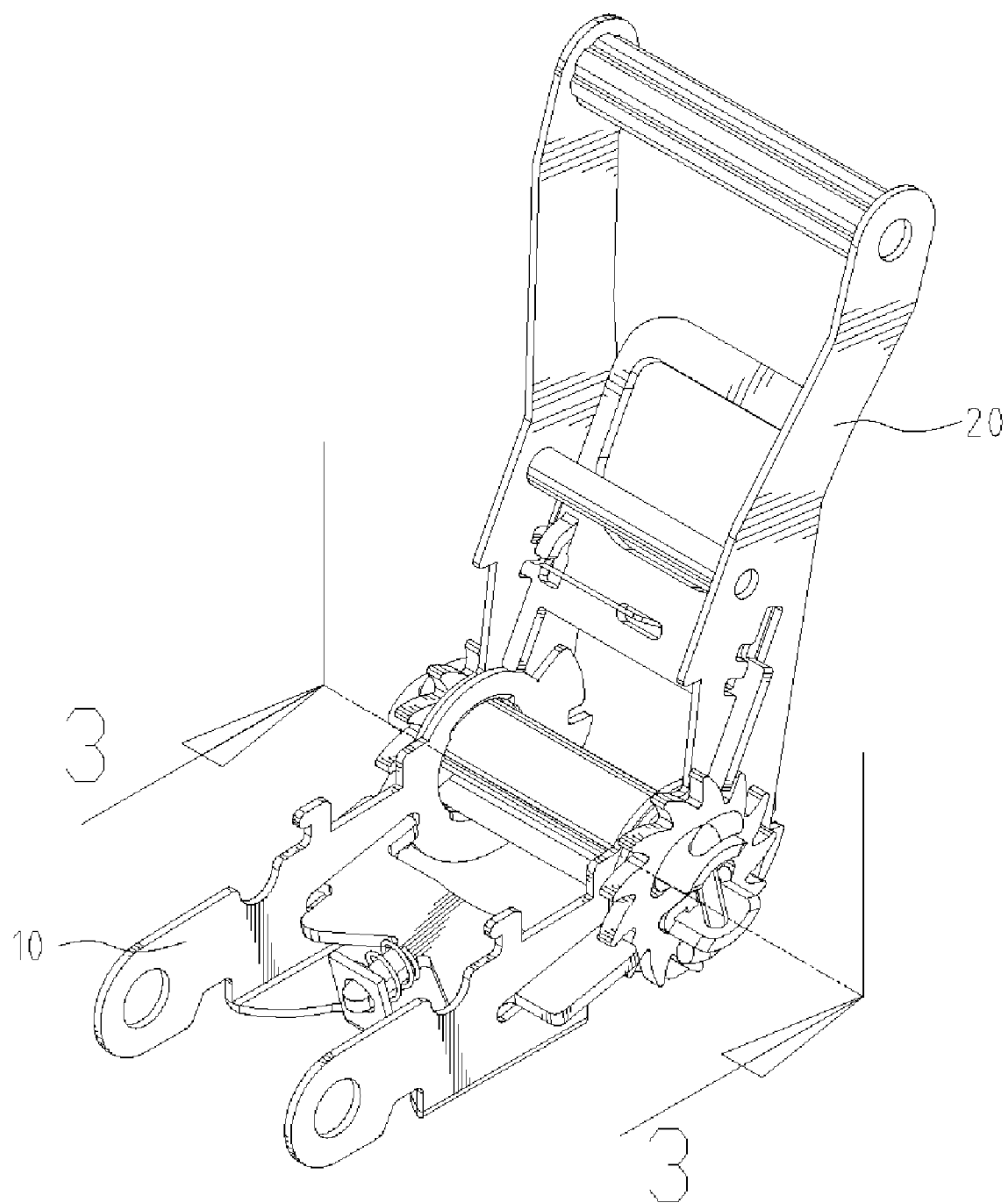
FIG. 1 is a perspective view of a fastener according to the first embodiment of the present invention.
Figure 2:
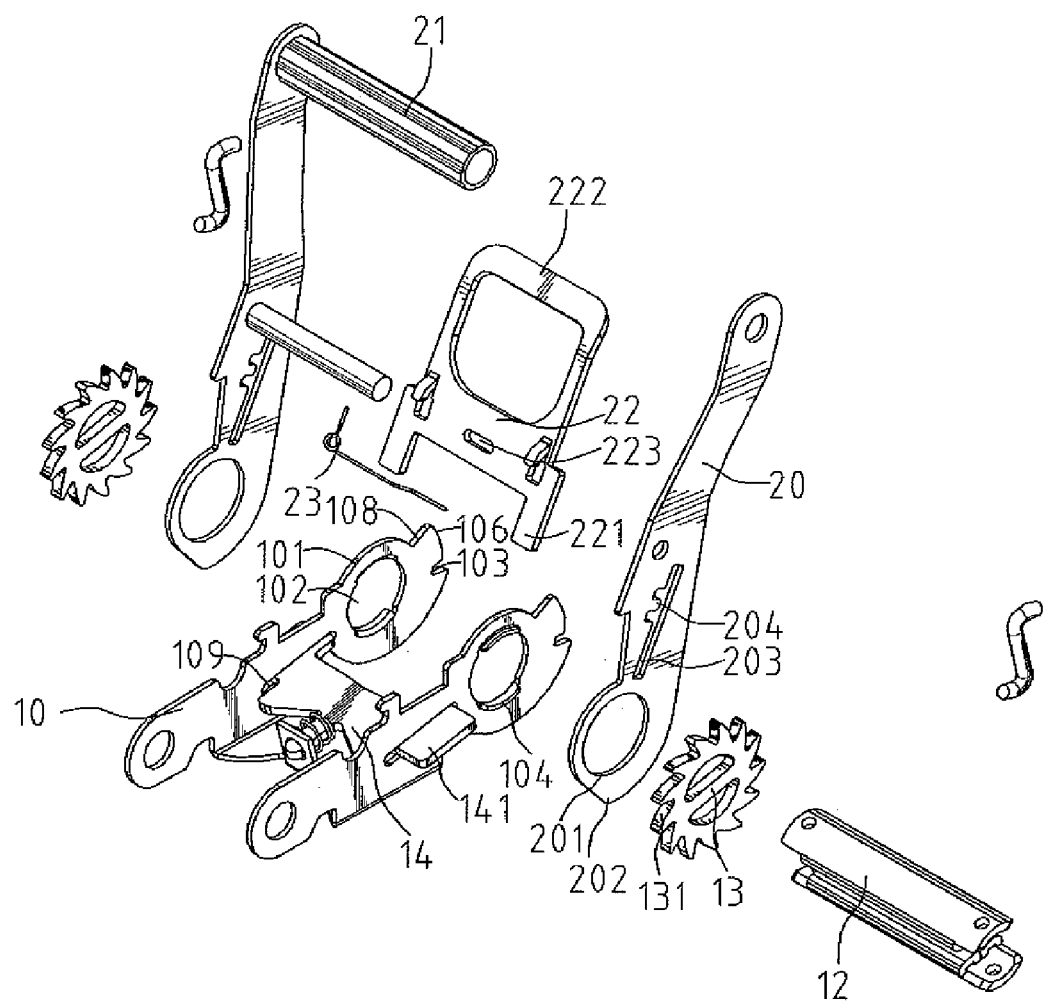
FIG. 2 is an exploded view of the fastener shown in FIG. 1.
Figure 3:
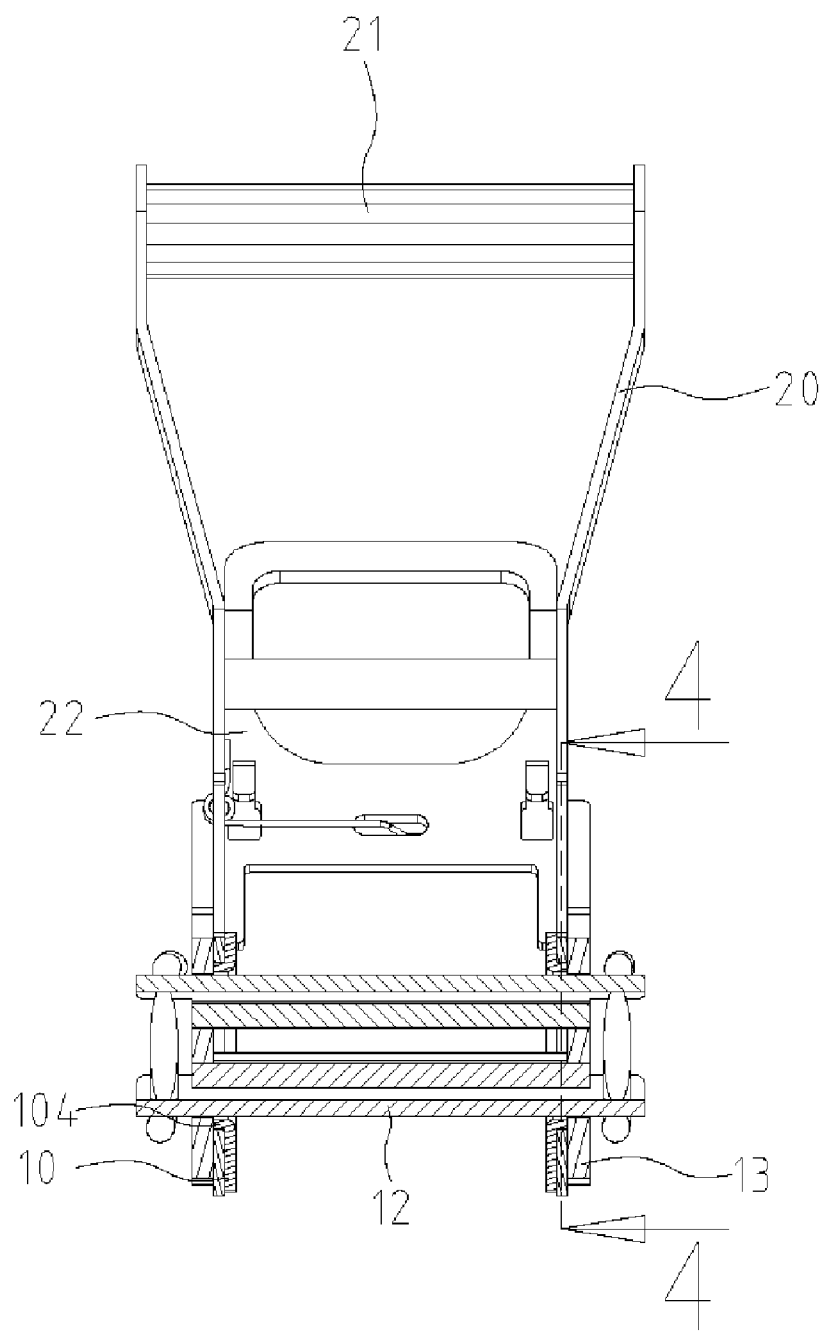
FIG. 3 is a cross-sectional view of the fastener taken along a line 3-3 shown in FIG. 1.
Figure 4:
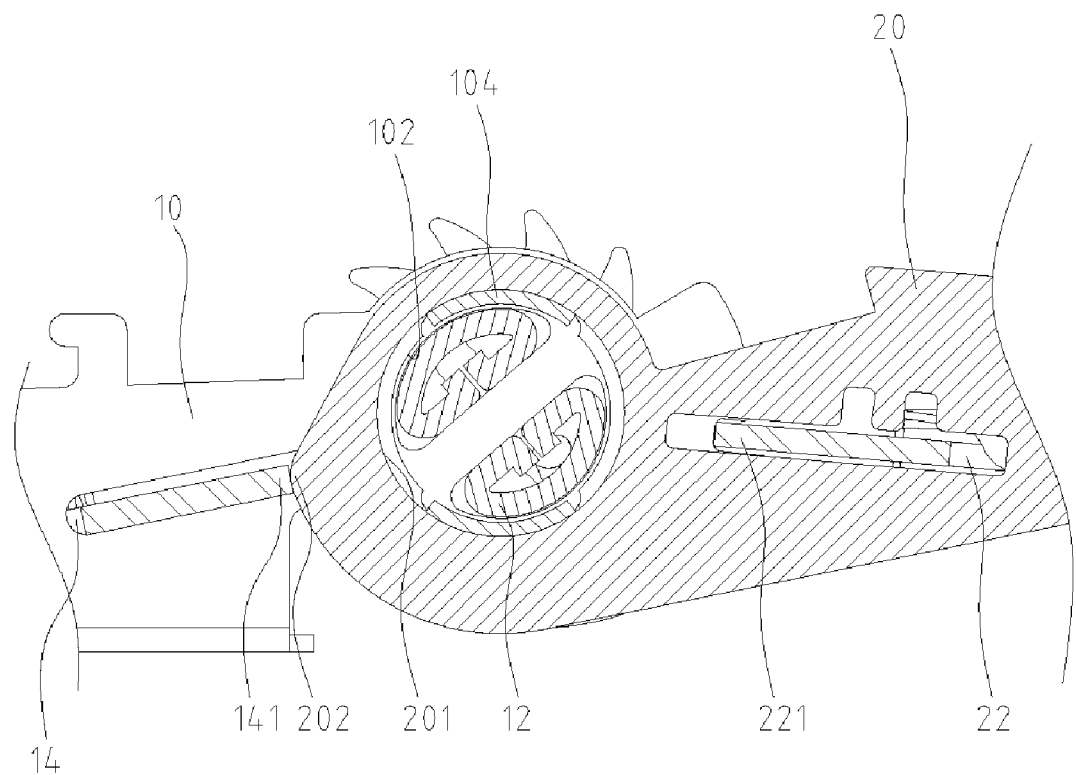
FIG. 4 is a cross-sectional view of the fastener taken along a line 4-4 shown in FIG. 3.

Referring to the FIGS. 1 through 4, a fastener is shown according to a first embodiment of the present invention.

The fastener includes a frame 10, a reel 12, two ratchet wheels 13, a handle 20, a first detent 14 and a second detent 22.

The frame 10 includes two walls on a floor. Each of the walls of the frame 10 includes an aperture 102 in an end, two arched ridges 104 around the aperture 102, a first arched edge 101 at the end, a second arched edge 106, a cutout 103 in the second arched edge 106, a shoulder 108 between the arched edges 101 and 106 and a slot 109 therein.

The handle 20 includes two walls and a grip 21 between the walls. Each of the walls of the handle 20 includes a cam 202 at an end, a slot 203 therein and a boss 204 thereon within the slot 203. An aperture 201 is defined in each of the cams 202.

The reel 12 is rotationally inserted in the apertures 201 of the handle 20 and the apertures 102 of the frame 10. The arched ridges 104 are inserted in the apertures 201.

Each of the ratchet wheels 13 includes ratchets 131. The ratchet wheels 13 are non-rotationally connected to the reel 12.

The first detent 14 includes two fins 141 inserted through the slots 109 of the walls of the frame 10 for engagement with the ratchets 131 of the ratchet wheels 13. A spring is compressed between the first detent 14 and a tab raised from the floor of the frame 10 for keeping the fins 141 engaged with the ratchets 131.

The second detent 22 includes two fins 221 inserted through the slots 203 of the walls of the handle 20 for engagement with the ratchets 131 of the ratchet wheels 13. The second detent 22 includes a grip 222 thereon and an aperture 223 therein.

An elastic element 23 is provided between the second detent 22 and a portion of the handle 20 for keeping the fins 221 engaged with the ratchets 131. The elastic element 23 is a torque spring with a helical portion, a first end extending from the helical portion and a second end extending from the helical portion. The helical portion of the elastic element 23 is mounted on the boss 204 of the walls of the handle 20. The first end of elastic element 23 is located against the wall of the handle 20. The second end of the elastic element 23 is inserted through the aperture 223 of the second detent 22.

Figure 11:
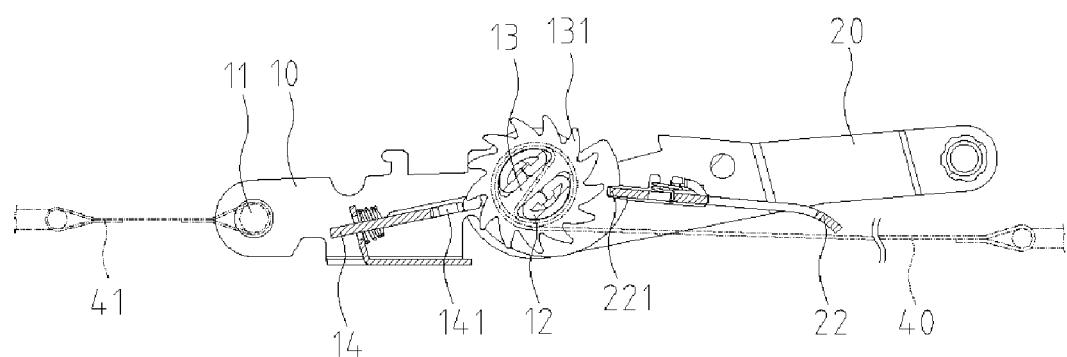
FIG. 11 is a reduced side view of the fastener in another position than shown in FIG. 10.

Referring to FIG. 11, a first strap 41 is connected to a crossbar 11 provided between the walls of the frame 10 while a second strap 40 is connected to the reel 12.

To fasten the straps 40 and 41, the handle 20 is pivoted from the frame 10. The ratchet wheels 13 are rotated by the second detent 22 connected to the handle 20. The rotation of the ratchets 13 is allowed by the first detent 14 moving on the frame 10. The second strap 40 is wound onto the reel 12 connected to the ratchet wheels 13. When the handle 20 is pivoted towards the frame 10, the second detent 22 rattles on the ratchet wheels 13 while the first detent 14 keeps the ratchet wheels 13 in position. The handle 20 is pivoted to and fro with respect to the frame 10 so that the straps 40 and 41 are fastened.

To loosen the straps 40 and 41, a user pulls the second detent 22 from the ratchet wheels 13 by the grip 222. The user pivots the handle 20 from the frame 10. The fins 221 are moved, past the shoulders 108, onto the second arched edges 106 from the first arched edges 101 with the second arched edges 106 disengaging the fins 221 from the ratchets 131 and with the cams 202 disengaging the fins 141 from the ratchets 131. Thus, the second strap 40 can be reeled out.

The reel 12 is protected from the handle 20 by the arched ridges 104 inserted in the apertures 201. That is, the reel 12 is not clamped by the handle 20 and the frame 10 and therefore can easily be rotated.

Figure 5:
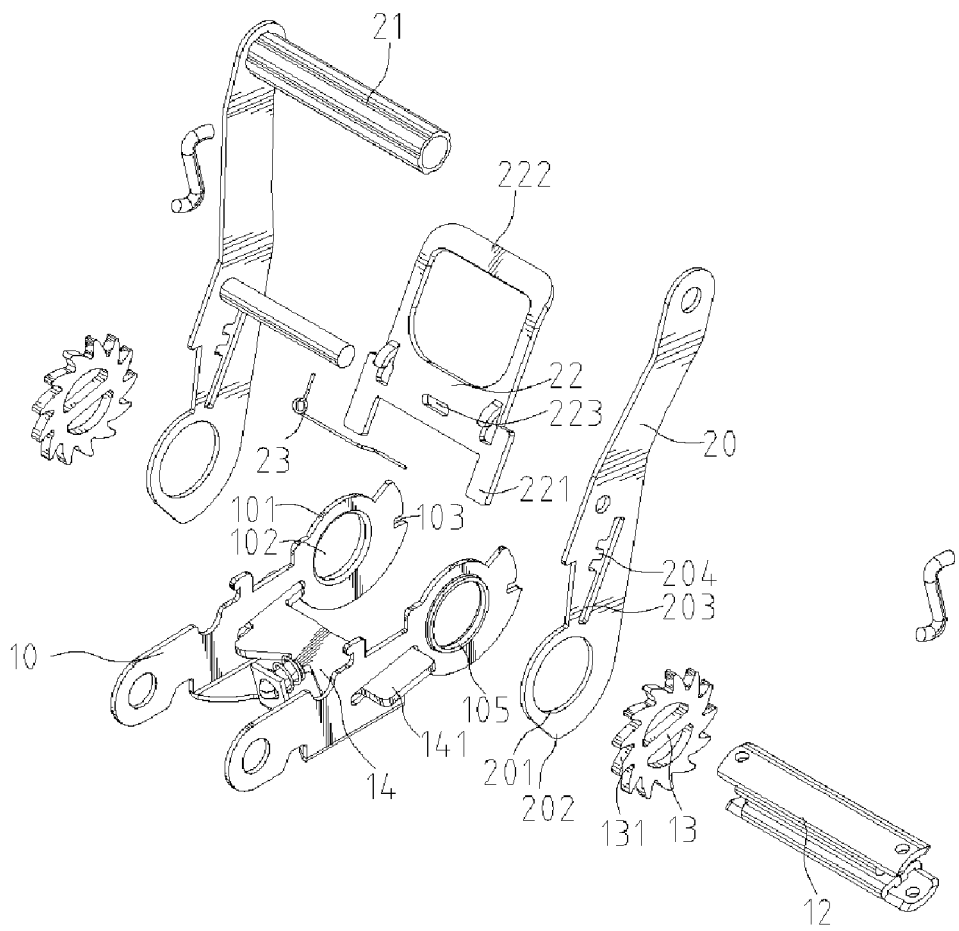
FIG. 5 is an exploded view of a fastener according to the second embodiment of the present invention.
Figure 6:
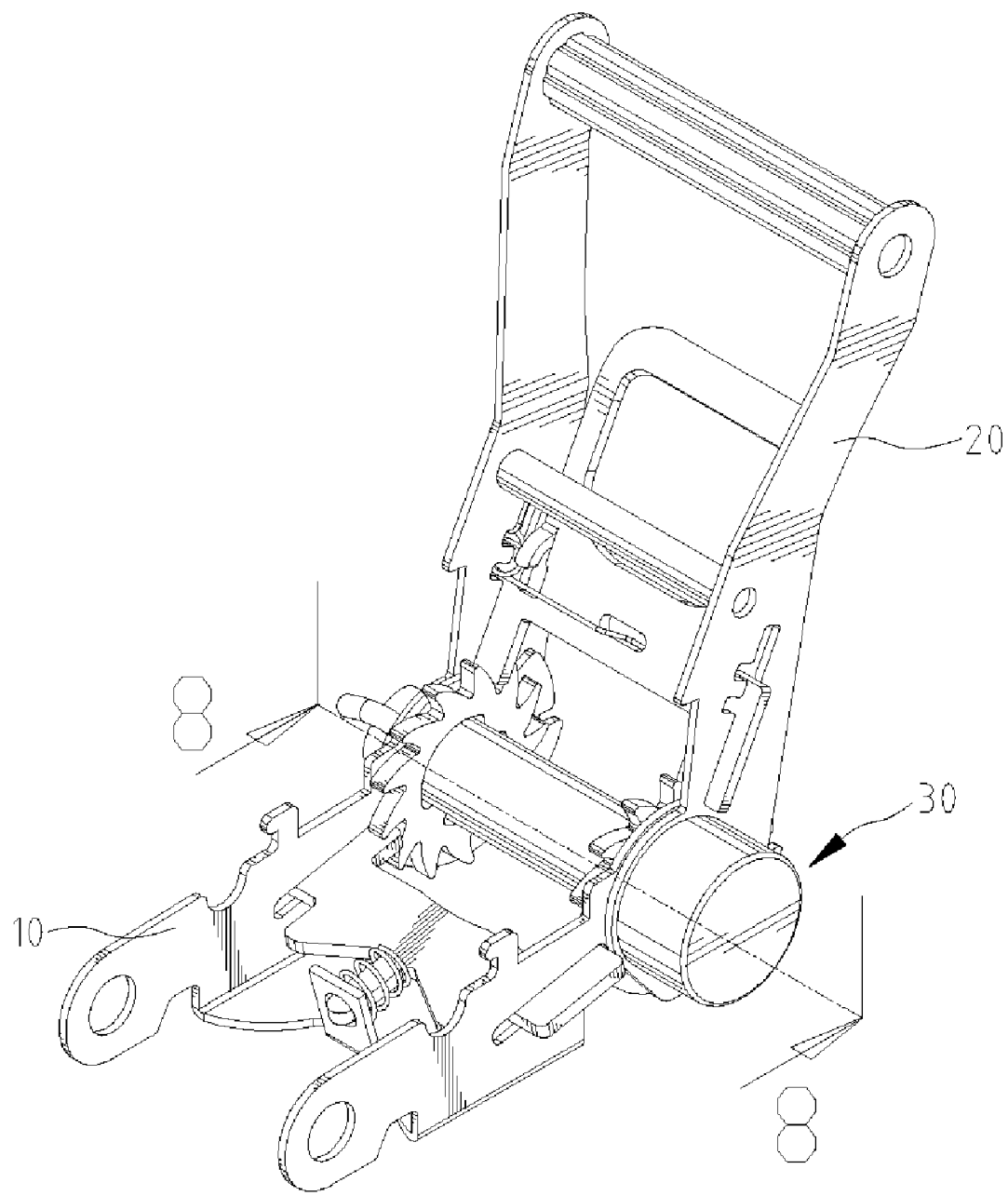
FIG. 6 is a perspective view of a fastener according to the third embodiment of the present invention.
Figure 7:
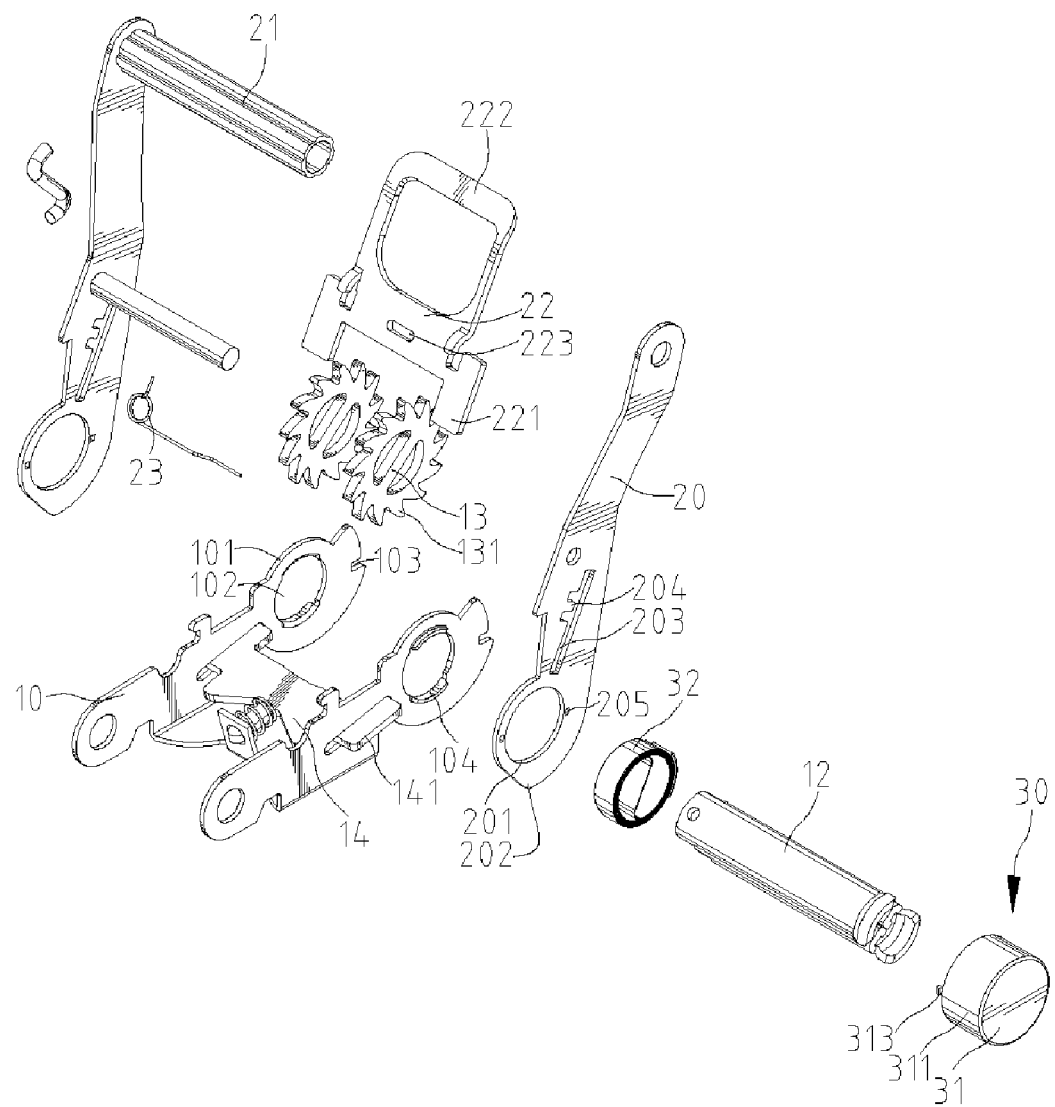
FIG. 7 is an exploded view of the fastener shown in FIG. 6.
Figure 8:
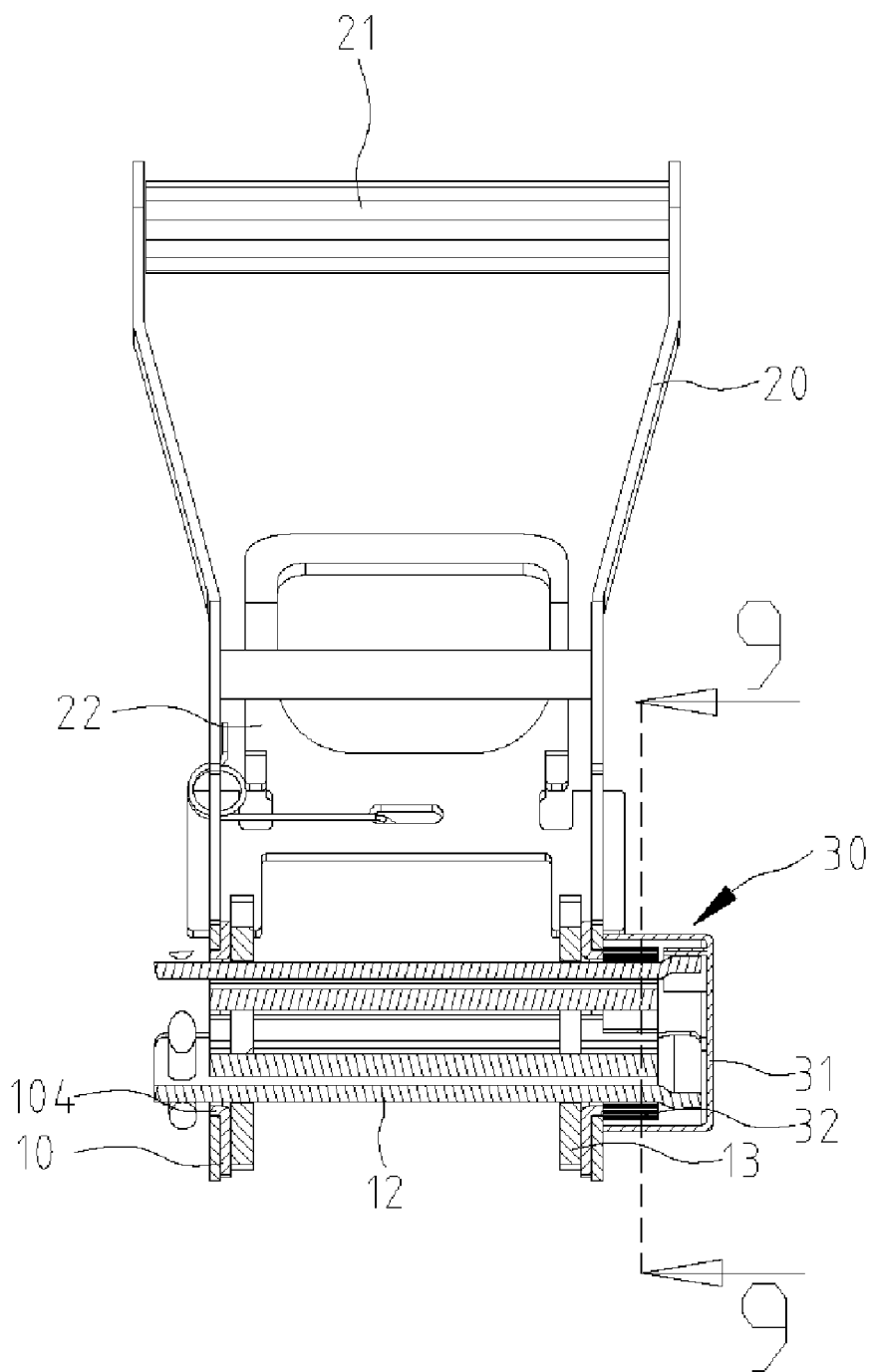
FIG. 8 is a cross-sectional view of the fastener taken along a line 8-8 shown in FIG. 6.
Figure 9:
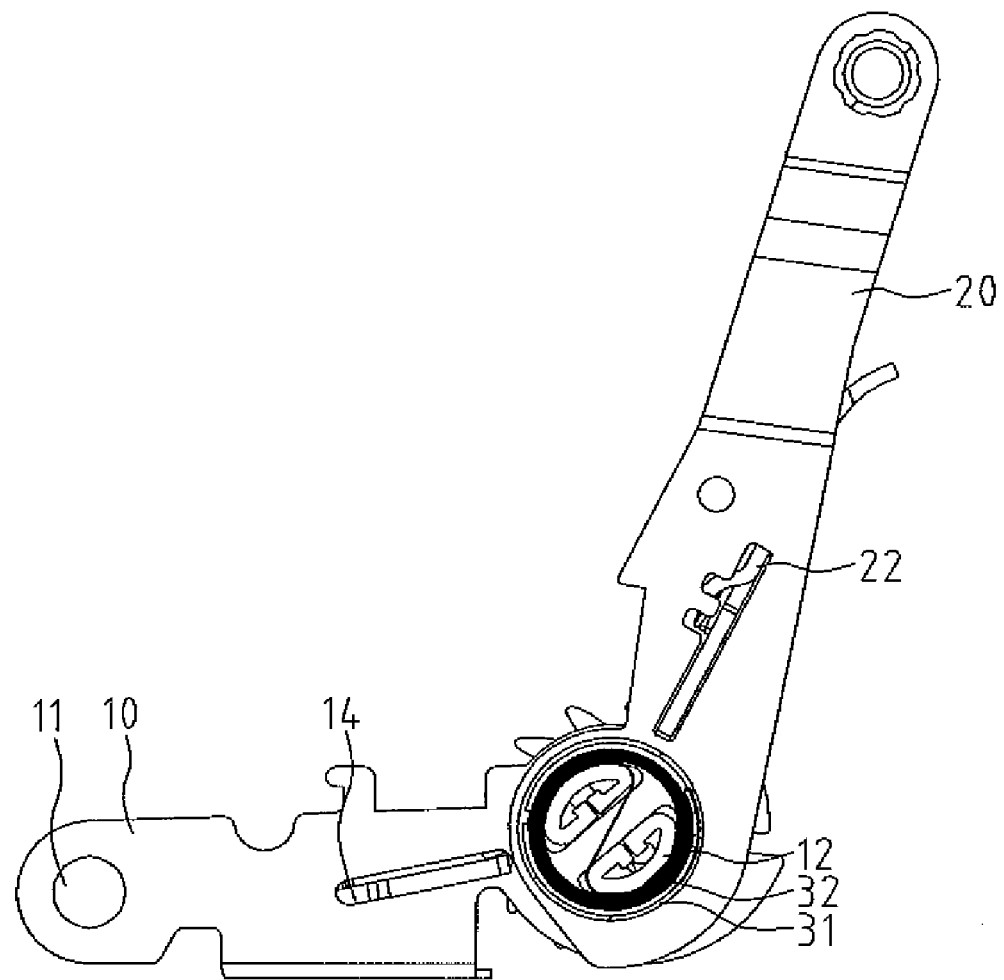
FIG. 9 is a cross-sectional view of the fastener taken along a line 9-9 shown in FIG. 8.
Figure 10:
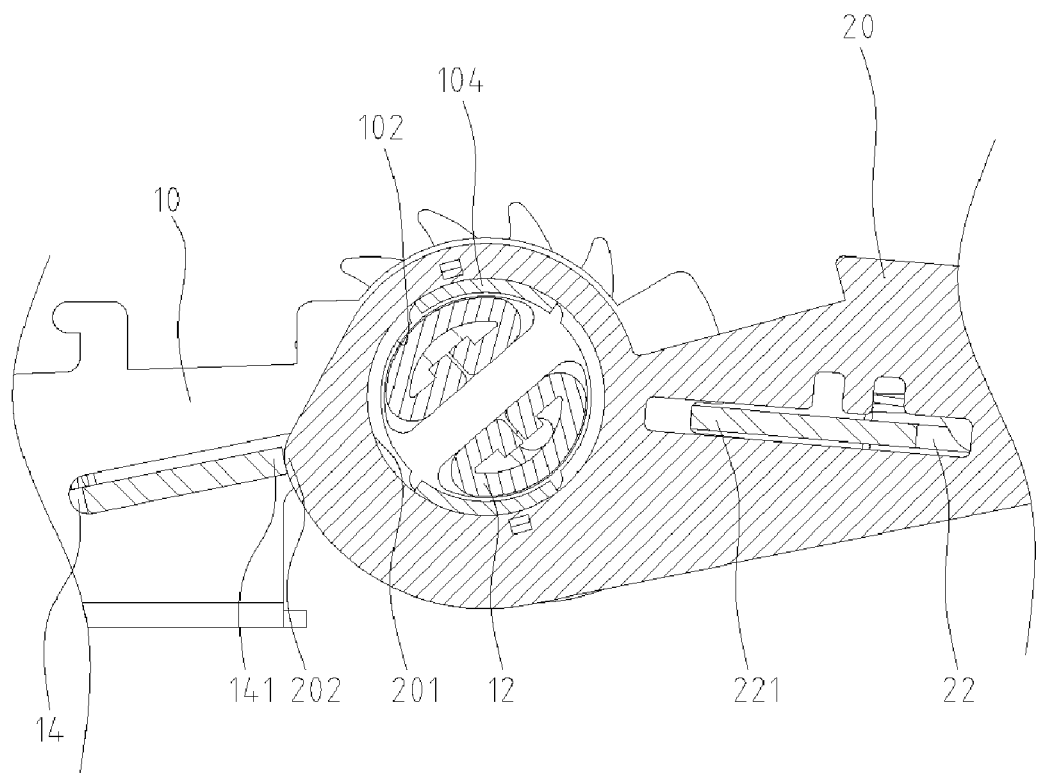
FIG. 10 is an enlarged view of the fastener in another position than shown in FIG. 9.

Referring to FIG. 5, a fastener is shown according to a second embodiment of the present invention. The second embodiment is like the first embodiment except that each of the walls of the frame 10 is formed with an annular ridge 105 instead of the arched ridge 104.

Referring to FIGS. 6 through 11, a fastener is shown according to a third embodiment of the present invention. The third embodiment is identical to the first embodiment except including an automatic reeling device 30.

The automatic reeling device 30 includes a cover 31 attached to one of the walls of the handle 20 and a coil spring 32 formed with an end connected to the wall of the handle 20 and another end connected to the cover 31.

The cover 31 covers the coil spring 32. The cover 31 includes a wall 311 and a plurality of hooks 313 extending from the wall 311. Each of the hooks 313 is inserted through an aperture 205 defined in the wall of the handle 20.

Figure 12:
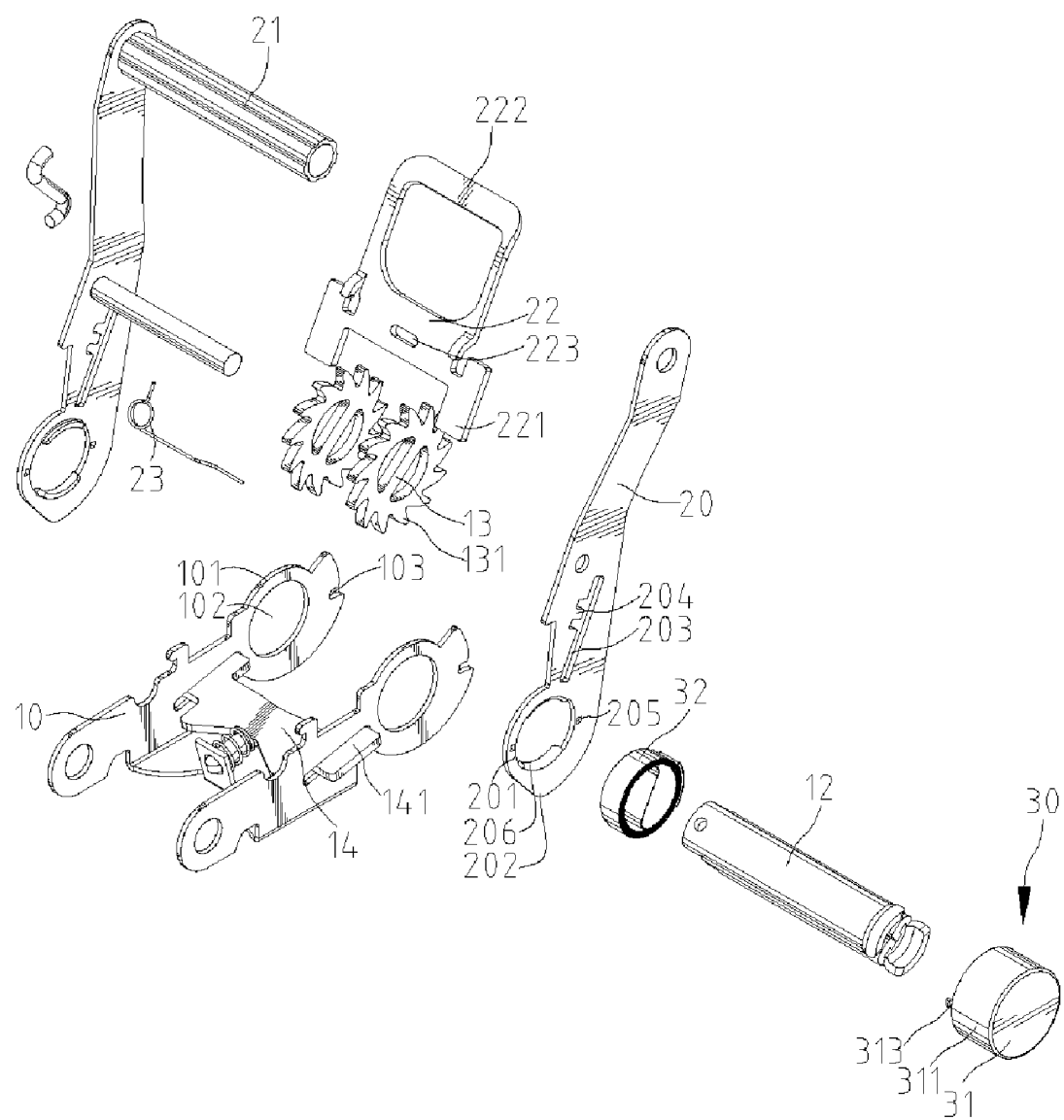
FIG. 12 is an exploded view of a fastener according to the fourth embodiment of the present invention.
Figure 13:
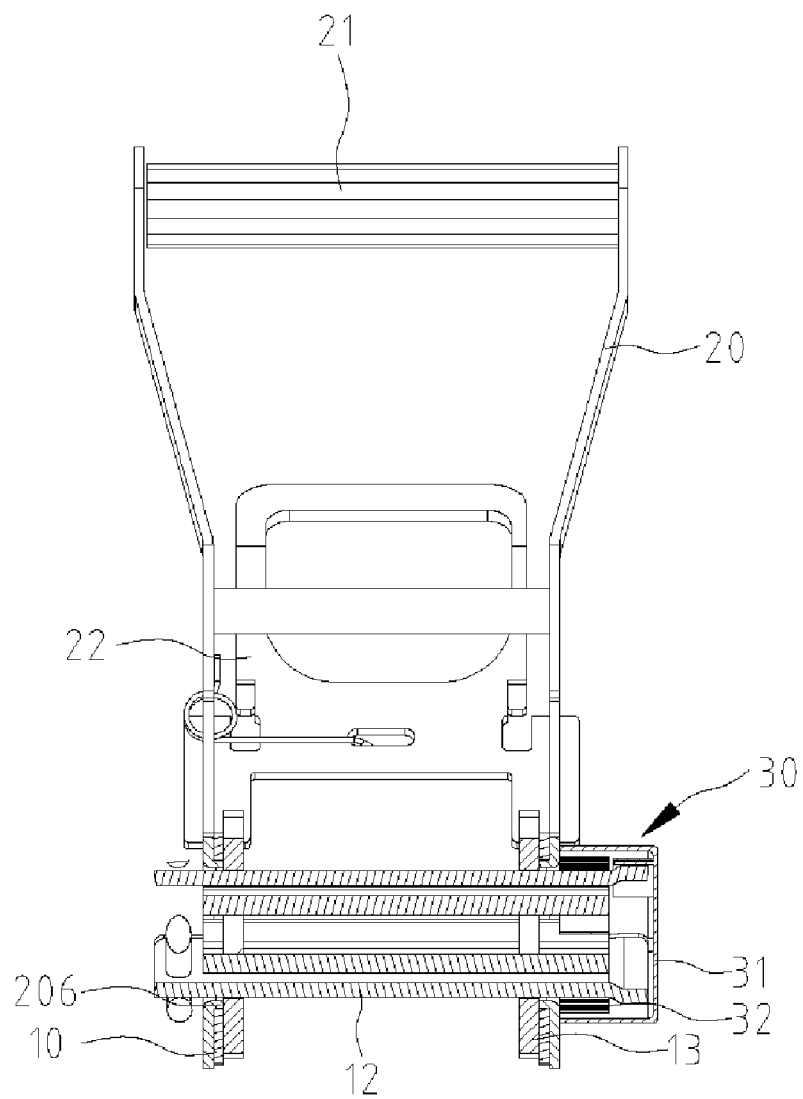
FIG. 13 is a cross-sectional view of the fastener shown in FIG. 12.

Referring to FIGS. 12 and 13, a fastener is shown according to a fourth embodiment of the present invention. The fourth embodiment is like the third embodiment except for two things. Firstly, the arched ridges 104 are omitted. Secondly, arched ridges 206 are formed around the aperture 201 in each of the cams 202. The arched ridges 206 keep the reel 12 from the frame 10 so that the reel 12 can freely be rotated.

Figure 14:
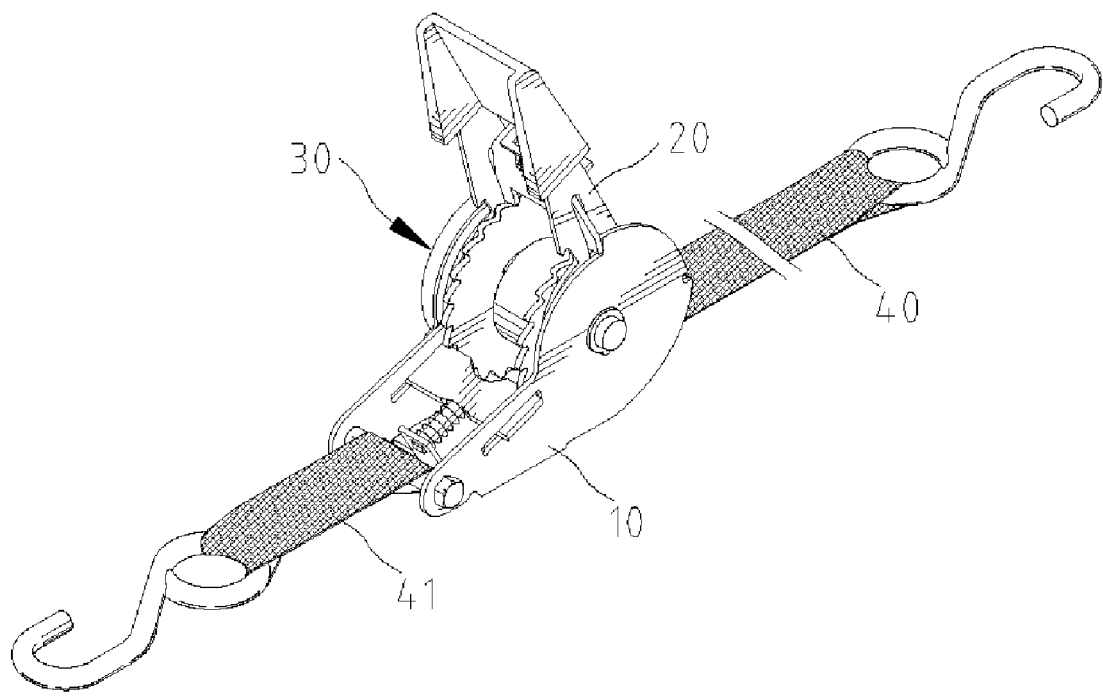
FIG. 14 is a perspective view of a fastener according to the fifth embodiment of the present invention.
Figure 15:
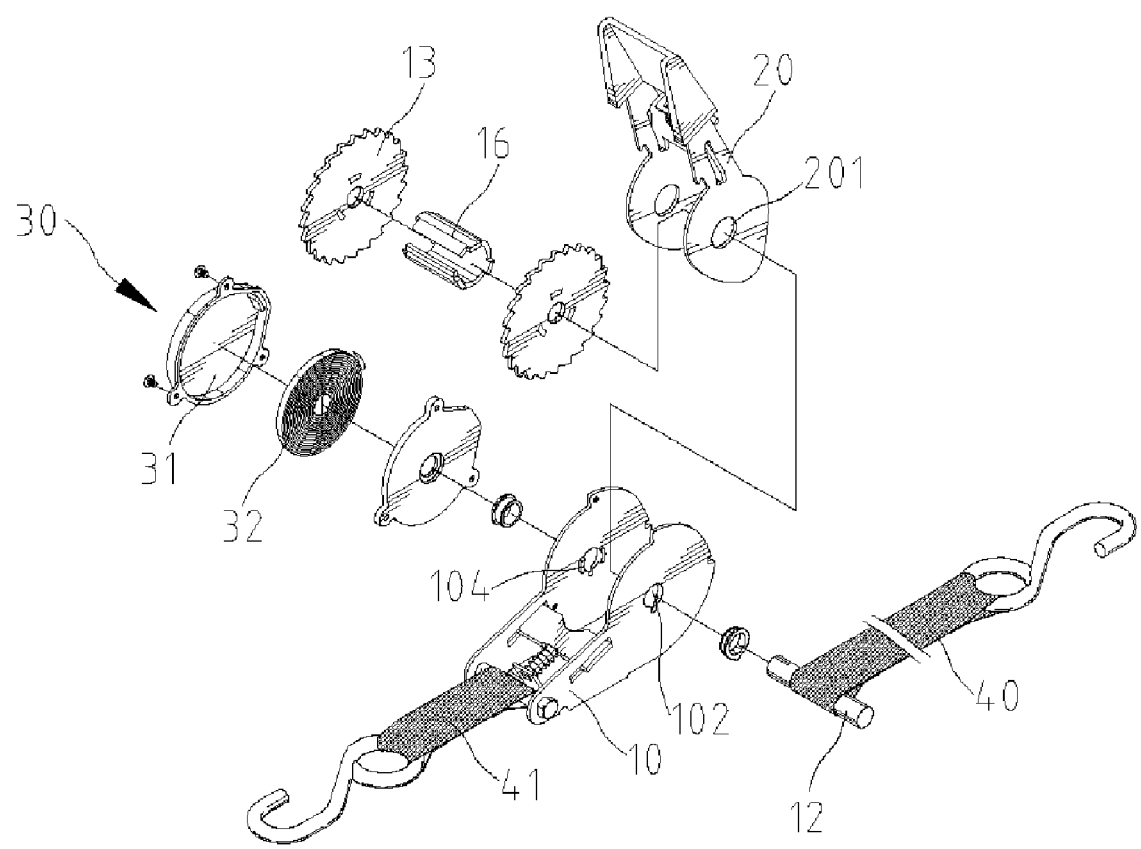
FIG. 15 is an exploded view of the fastener shown in FIG. 14.
Figure 16:
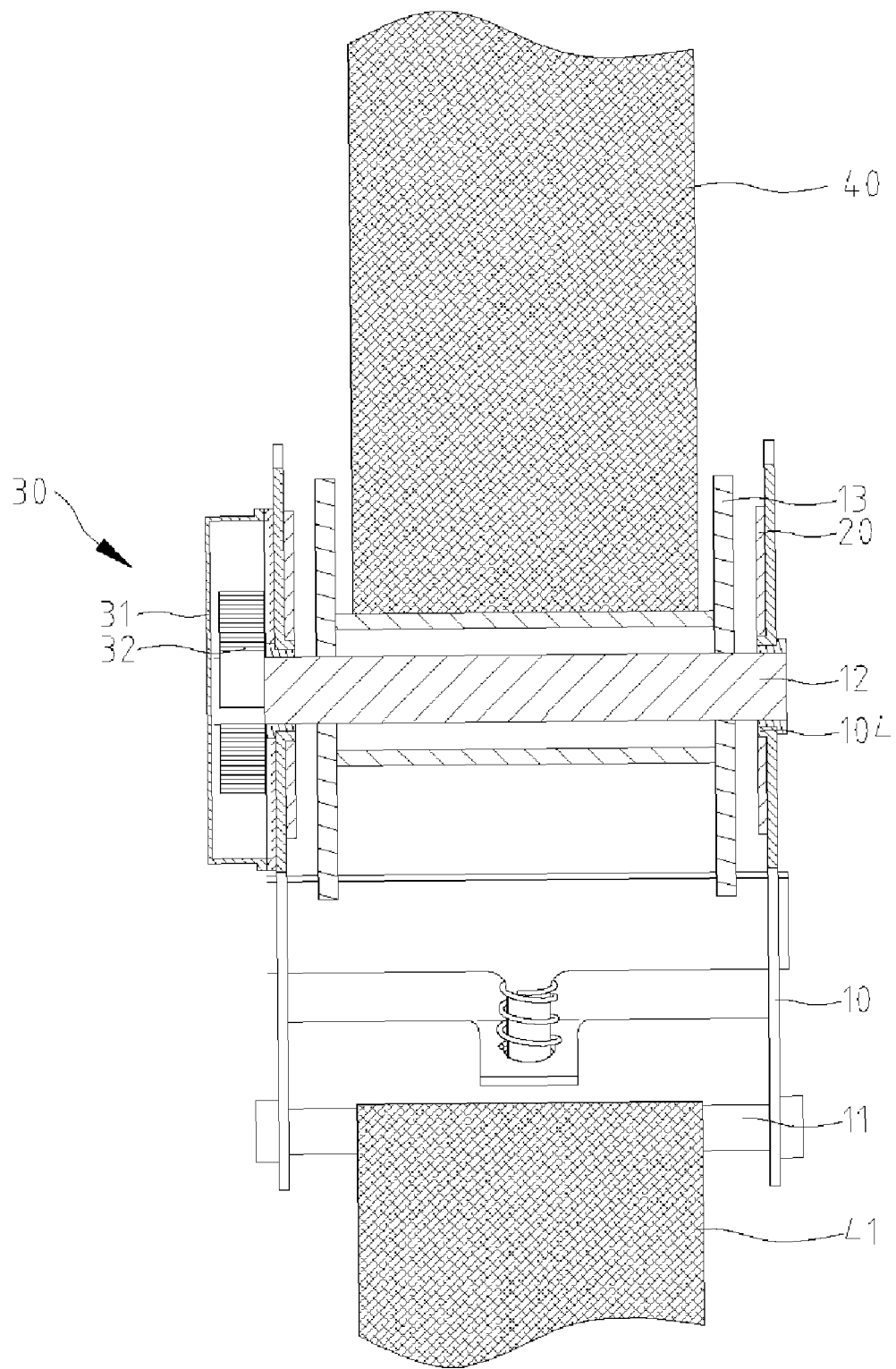
FIG. 16 is a cross-sectional view of the fastener shown in FIG. 14.
Figure 17:
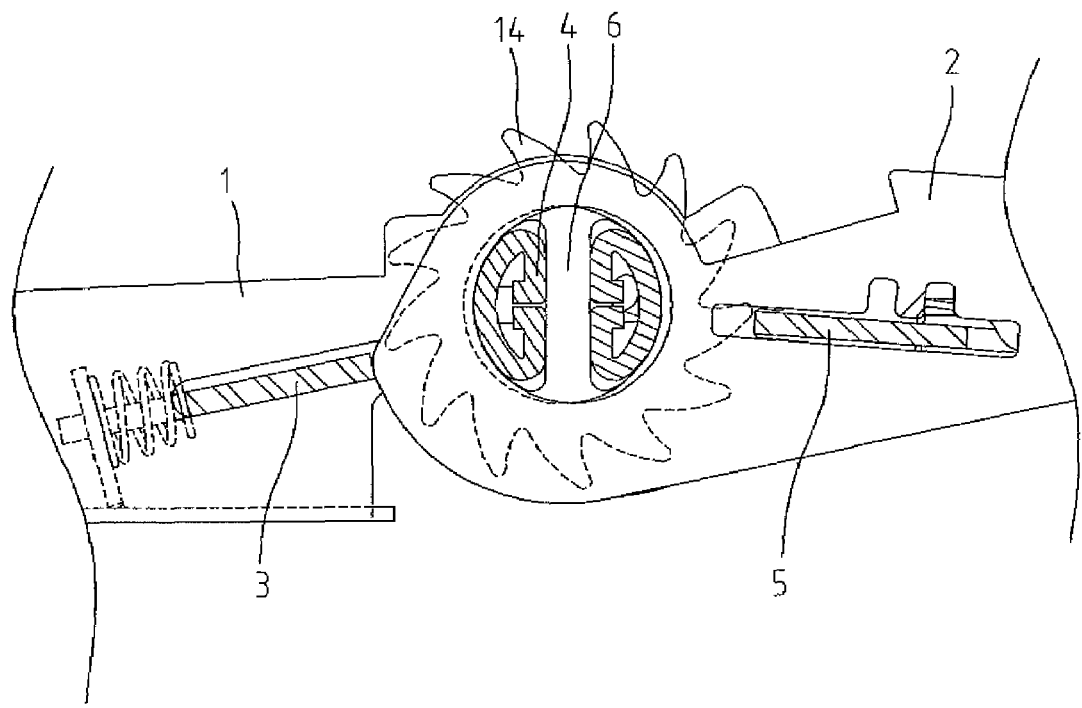
FIG. 17 is a side view of a conventional fastener.

Referring to FIGS. 14 through 16, a fastener is shown according to a fifth embodiment of the present invention. The fifth embodiment is like the third embodiment except including a cylinder 16. The ratchet wheels 13 are connected to the cylinder 16 instead of the reel 12.

The fastener according to the present invention exhibits advantages. Firstly, the reeling out is easy since the arched ridges keep the reel 12 from the handle 20.

Secondly, the reeling out is easy since the arched ridges keep the reel 12 from the frame 10.

Thirdly, the reeling in after use is easy because of the automatic reeling device 30.

The present invention has been described via the detailed illustration of the embodiments. Those skilled in the art can derive variations from the embodiments without departing from the scope of the present invention. Therefore, the embodiments shall not limit the scope of the present invention defined in the claims.

What is claimed is:

1. A fastener comprising:
   a frame;
   a handle;
   a reel inserted through the frame and the handle so that a strap can be reeled when the reel is rotated;
   two protective units formed on one of the frame and handle for protecting the reel from the remaining one of the frame and the handle, wherein each of the protective units comprises at least two arched ridges;
   two ratchet wheels connected to the reel;
   a first detent movable on the frame for engagement with the ratchet wheels; and
   a second detent movable on the handle for engagement with the ratchet wheels.

2. The fastener according to claim 1 wherein the protective units are formed on the frame.

3. The fastener according to claim 1 wherein the protective units are formed on the handle.

4. The fastener according to claim 1 wherein the arched ridges are formed on the frame, and the frame defines two apertures each defined within the arched ridges of a related one of the protective units, and the handle defines two apertures in which the arched ridges are inserted for protecting the reel from the handle when the reel is inserted through the apertures of the frame and the handle.

5. The fastener according to claim 1 wherein the arched ridges are formed on the handle, and the handle defines two apertures each defined within the arched ridges of a related one of the protective units, and the frame defines two apertures in which the arched ridges are inserted for protecting the reel from the handle when the reel is inserted through the apertures of the frame and the handle.

6. The fastener according to claim 1 wherein the second detent comprises a grip operable for disengaging the second detent from the ratchet wheels.

7. The fastener according to claim 1 comprising an automatic reeling device provided between the handle and the reel.

8. The fastener according to claim 7 wherein the automatic reeling device comprises a coil spring connected to the handle at an end and connected to the reel at another end.

9. The fastener according to claim 8 wherein the automatic reeling device comprises a cover attached to the handle for covering the coil spring.

10. A fastener comprising:
    a frame;
    a handle;
    a reel inserted through the frame and the handle so that a strap can be reeled when the reel is rotated;
    two protective units formed on one of the frame and handle for protecting the reel from the remaining one of the frame and the handle, wherein each of the protective units comprises an annular ridge;
    two ratchet wheels connected to the reel;
    a first detent movable on the frame for engagement with the ratchet wheels; and
    a second detent movable on the handle for engagement with the ratchet wheels.

11. The fastener according to claim 10 wherein the annular ridges are formed on the frame, and the frame defines two apertures each defined within a related one of the annular ridges, and the handle defines two apertures in which the annular ridges are inserted for protecting the reel from the handle when the reel is inserted through the apertures of the frame and the handle.

12. A fastener comprising:
- a frame;
- a handle;
- a reel inserted through the frame and the handle so that a strap can be reeled when the reel is rotated;
- two protective units formed on one of the frame and handle for protecting the reel from the remaining one of the frame and the handle;
- two ratchet wheels connected to the reel;
- a first detent movable on the frame for engagement with the ratchet wheels;
- a second detent movable on the handle for engagement with the ratchet wheels;
- an automatic reeling device provided between the handle and the reel and comprising, a coil spring connected to the handle at an end and connected to the reel at another end, and a cover attached to the handle for covering the coil spring, wherein the cover is formed with hooks, and the handle defines apertures for receiving the hooks.

13. The fastener according to claim 12 comprising an elastic element provided between the handle and the second detent.

14. The fastener according to claim 13 wherein the elastic element is a torque spring.

* * * * *